US005363749A

United States Patent [19]
Hurley et al.

[11] Patent Number: 5,363,749
[45] Date of Patent: Nov. 15, 1994

[54] MICROWAVE ENHANCED DEEP FAT FRYER

[75] Inventors: James R. Hurley, E. Weymouth; Paul J. Childs, Swampscott; Timothy J. Norman, Wayland, all of Mass.

[73] Assignee: Tecogen, Inc., Waltham, Mass.

[21] Appl. No.: 118,122

[22] Filed: Sep. 7, 1993

Related U.S. Application Data

[60] Division of Ser. No. 893,591, Jun. 2, 1992, abandoned, which is a continuation of Ser. No. 494,588, Mar. 16, 1990, abandoned.

[51] Int. Cl.⁵ .................... A47J 37/12; A23L 1/025
[52] U.S. Cl. ......................... 99/403; 99/418; 99/451; 99/DIG. 14; 219/725; 219/728; 219/731
[58] Field of Search ............ 99/331, 403, 410, 418, 99/451, DIG. 14; 219/10.55 E, 10.55 F, 10.55 R

[56] References Cited

U.S. PATENT DOCUMENTS

| | | | |
|---|---|---|---|
| 2,714,070 | 7/1955 | Welch | 99/DIG. 14 |
| 2,856,497 | 10/1958 | Rudenberg | 219/10.55 E |
| 2,997,566 | 8/1961 | Pierce | 99/DIG. 14 |
| 4,280,032 | 7/1981 | Levinson | 219/10.55 E |
| 4,416,906 | 11/1983 | Watkins | 219/10.55 E |
| 4,510,361 | 4/1985 | Mahan | 219/10.55 R |
| 4,580,024 | 4/1986 | Thomas | 99/DIG. 14 |
| 4,831,224 | 5/1989 | Keefer | 219/10.55 E |
| 4,859,822 | 8/1989 | Ragusa | 219/10.55 E |

Primary Examiner—David A. Scherbel
Assistant Examiner—Randall E. Chin
Attorney, Agent, or Firm—Fish & Richardson

[57] ABSTRACT

A microwave radiation source is introduced into a fry basket within the fry tank of a deep fat fryer to reduce the cooking time of food products within the fry basket. Microwave energy is generated outside the fry tank and coupled into the fry basket by a microwave tuned transition, waveguide and antenna. Microwave chokes seal the basket top cover and microwave antenna to basket interface to confine the microwave energy to the fry basket. An electrical safety interlock prevents generation of microwave energy unless the fry basket is sealed.

17 Claims, 7 Drawing Sheets

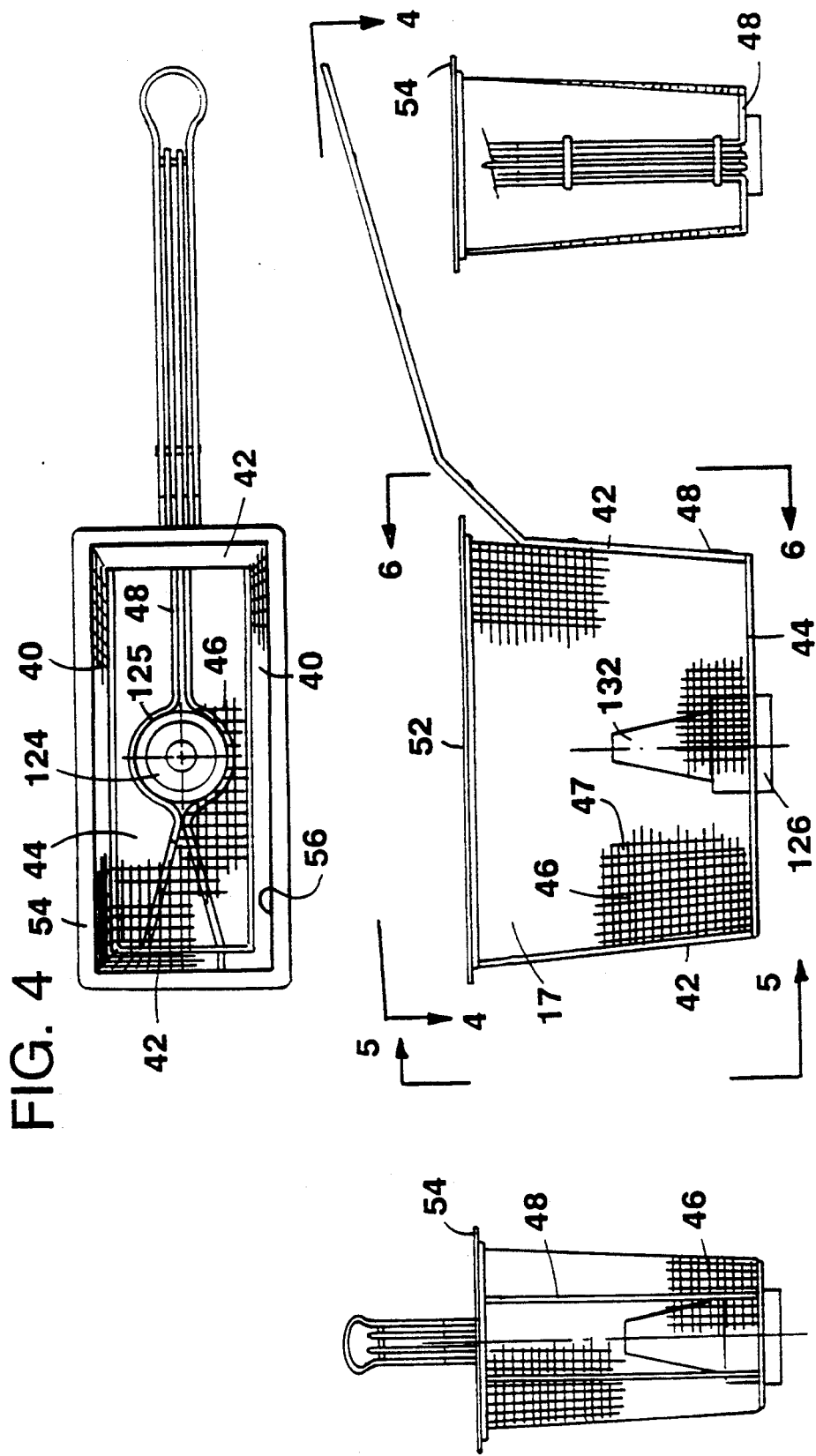

MICROWAVE ENHANCED DEEP FAT FRYER

This is a divisional of copending application Ser. No. 07/893,591, filed Jun. 2, 1992, now abandoned which was a file wrapper continuation of application Ser. No. 07/494,588, filed Mar. 16, 1990, now abandoned.

BACKGROUND OF THE INVENTION

This invention relates to microwave enhanced deep fat fryers for cooking food products.

It is widely held that deep fat frying is the fastest traditional method of cooking food by thermal energy alone. Deep fat frying imparts a special flavor to the food product as some of the cooking oil is absorbed by the food product during the cooking process. Additionally food products cooked by deep fat frying exhibit an appealing crispy texture and brown appearance. Microwave cooking alone cannot match the taste, texture or appearance of the food product cooked by deep fat frying.

Customer feedback indicates that to be successful, high volume fast food restaurants must offer fast, hot, attractive and consistently cooked food products. For high volume restaurants some deep fat fried foods, such as chicken nuggets, are normally fried ahead of time in a deep fat fryer and discarded if not sold within a few minutes. This is because the length of frying time is longer than the targeted order-placement to order-filled time required for efficient fast food operation. This method often detracts from the quality of the product when served since it may have been cooked many minutes earlier. Discarding cooked but unordered food products significantly increases waste. Microwave enhanced deep fat frying to order within the target time produces a hotter, more consistent product, while maintaining its deep fat fried appearance, crispness and flavor.

Ideally, a microwave enhanced deep fat fryer should make efficient use of microwave energy by delivering it directly to the food product while minimizing the use of microwave energy to heat the frying oil. Additionally, a microwave enhanced deep fat fryer should require no special training to use, have the same form and require no more floor space than current non-enhanced deep fat fryers.

SUMMARY OF THE INVENTION

A general feature of the invention is the provision of a microwave enhanced deep fat fryer with a fry tank containing heated cooking oil, an oil porous cooking vessel such as a wire basket, for immersing food products in the oil, and means for introducing and confining microwave energy within the same cooking vessel. One preferred embodiment heats the cooking oil with a typical natural gas fired fire tube.

Another general feature of the invention comprises introduction of the microwave radiating source from within a removable cooking vessel. In the preferred embodiment this is achieved by forming a conical recess, in the bottom of the basket, into which a microwave antenna is introduced. A coaxial waveguide is coupled and tuned to the antenna in the cooking vessel to transfer microwave energy from a microwave energy source to the antenna. A magnetron microwave source generates microwave energy which is coupled to the coaxial waveguide by a rectangular transition waveguide positioned between the magnetron and the coaxial waveguide.

A further aspect of the invention includes microwave chokes associated with the cooking vessel to prevent microwave energy leakage out of the cooking vessel. One preferred embodiment combines a microwave tight steel mesh cooking vessel, a microwave choke embedded in the cooking vessel cover, and another microwave choke around the cooking vessel to coaxial waveguide interface.

Yet another aspect of the invention includes an electrical safety interlock to prevent undesirable activation of the microwave energy. One preferred embodiment uses a safety interlock responsive to the position of the cooking vessel cover to control activation of the magnetron.

DESCRIPTION OF THE PREFERRED EMBODIMENT

A brief description of the drawings is as follows:

FIGS. 3–6 are side, plan, front and back views of the fry basket microwave reactor of FIG. 1, respectively, showing steel frame construction, microwave impenetrable steel mesh, microwave antenna saddle and associated microwave saddle seal.

FIG. 14 is a cross-sectional view of the slotted ¼ wavelength microwave choke element of FIG. 13.

STRUCTURE

Figure 2:
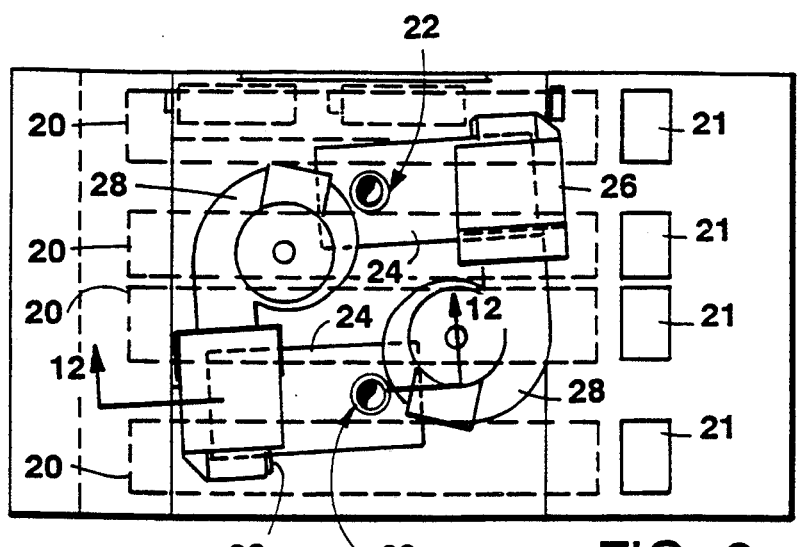
FIG. 2 is a cross-sectional plan view of the microwave enhanced deep fat fryer of FIG. 1, showing the microwave generating apparatus including magnetrons, magnetron cooling fans, transition couplings and coaxial microwave waveguides for the twin basket reactors.
Figure 1:
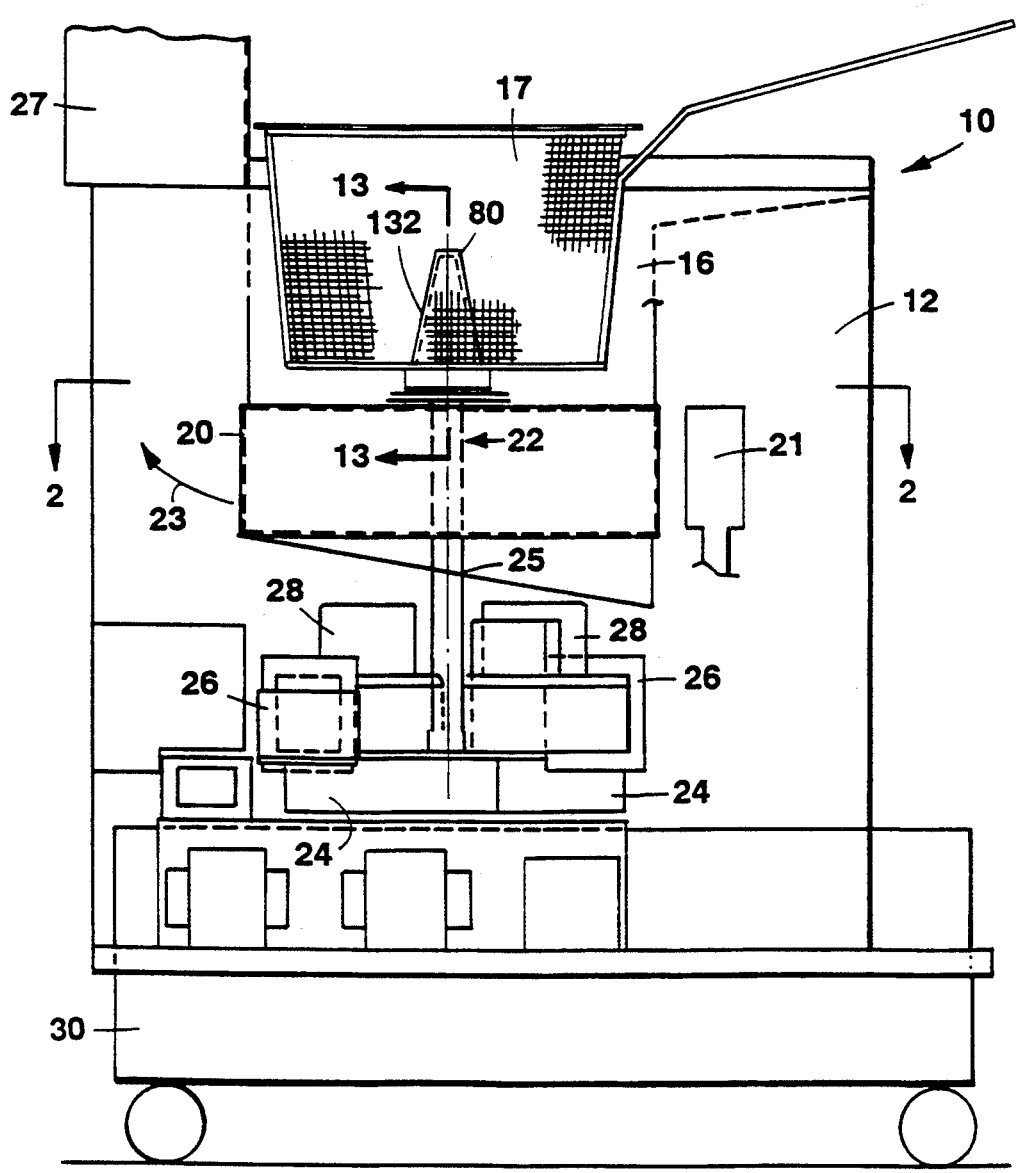
FIG. 1 is a side view of a microwave enhanced deep fat fryer showing the relationship of the microwave generators and waveguides, fired heating apparatus and one of two fry basket microwave reactors.

As shown in FIGS. 1 and 2, a microwave enhanced deep fat fryer 10 employing conventional heating combined with advanced microwave cooking technology designed primarily for commercial restaurant operation is designed to be a free standing dual basket deep fat fryer configuration. A preferred embodiment incorporates a microwave cooking system as a modification to a stand alone gas fired dual basket deep fat fryer such as a Decathlon 35, commercially available from Dean Alco Corp., Los Angles, Calif., incorporated herein by reference.

Cabinet 12 has a cavity or fry tank 16 designed to accept two side by side fry basket reactors (one shown) 17 containing food product to be simultaneously fried and microwaved. The fry tank 16 holds a predetermined level of frying oil into which the fry basket reactors 17 holding food product are immersed. A series of four conventional gas fired fire tubes 20 heat the fat to a temperature sufficient to cause deep fat frying of the food product immersed in the heated cooking oil.

A pair of coaxial microwave waveguides 22 (FIG. 2) are positioned in the fry tank below the center of each fry basket reactor 17 to introduce microwave energy directly into the basket by means of an antenna protruding through the bottom of each basket. Each elongated microwave coaxial waveguide 22 extends up from microwave transition waveguide 24 through aperture 25 in the bottom of the fry tank cavity 16 and is terminated in an antenna that fits into fry basket saddle 132. Microwave generating magnetrons 26 develop the required microwave energy which is transferred through coaxial microwave waveguides 22 to cook the food product in the baskets 17. Cooling fans 28 provide cooling to each of the two magnetrons 26. Gas fired fire tubes 20, fired by gas burners 21, extend the length of the fry chamber 16. The fire tubes 20 are in contact with the frying oil in fry tank 16 and thereby heats the oil to its frying temperature. Fire tube exhaust gasses 23 are ported out of the fryer through chimney 27. The coaxial waveguides 22 are small enough to pass through the space between the standard gas fired fire tubes 20 without significantly altering the form or positioning of the fire tubes. Additionally, the microwave component packaging is such that all fryer options are available including the bulky roll away filter 30 standard on most deep fat fryers.

As shown in FIGS. 3–6, fry basket reactor 17 has two long sides 40, two ends 42 and a bottom 44, made of stainless steel wire mesh 46 formed around a rigid stainless steel frame 48. The size of the openings 47 in the stainless steel mesh 46 is closely controlled to prevent microwave leakage out of the basket, while allowing free circulation of hot oil through the basket. A handle 50 angularly extends out from one end 42 above basket opening 52 to allow easy manual immersion of the basket into and out of hot fry tank 16. Basket opening 52 has a rectangular peripheral lip 54 surrounding and extending out from the edge of the opening 56.

A central aperture 124 is disposed in the bottom 44 of the basket 17 to accommodate the microwave antenna assembly 80 (FIG. 1). Cone shaped Teflon basket saddle 132 (TEFLON is a registered trademark for polytetrafluroethylene materials) is shaped to accept antenna assembly 80 and prevents food product from falling through aperture 124. Basket saddle 132 is made of a high temperature tolerant, low microwave loss material. Additionally, microwave basket seal 126 is an annular component surrounding the aperture 124 which when placed over the choke components of antenna assembly 80 prevents leakage of microwave energy through aperture 124, as discussed below in conjunction with FIGS. 12 and 13.

Figure 7:
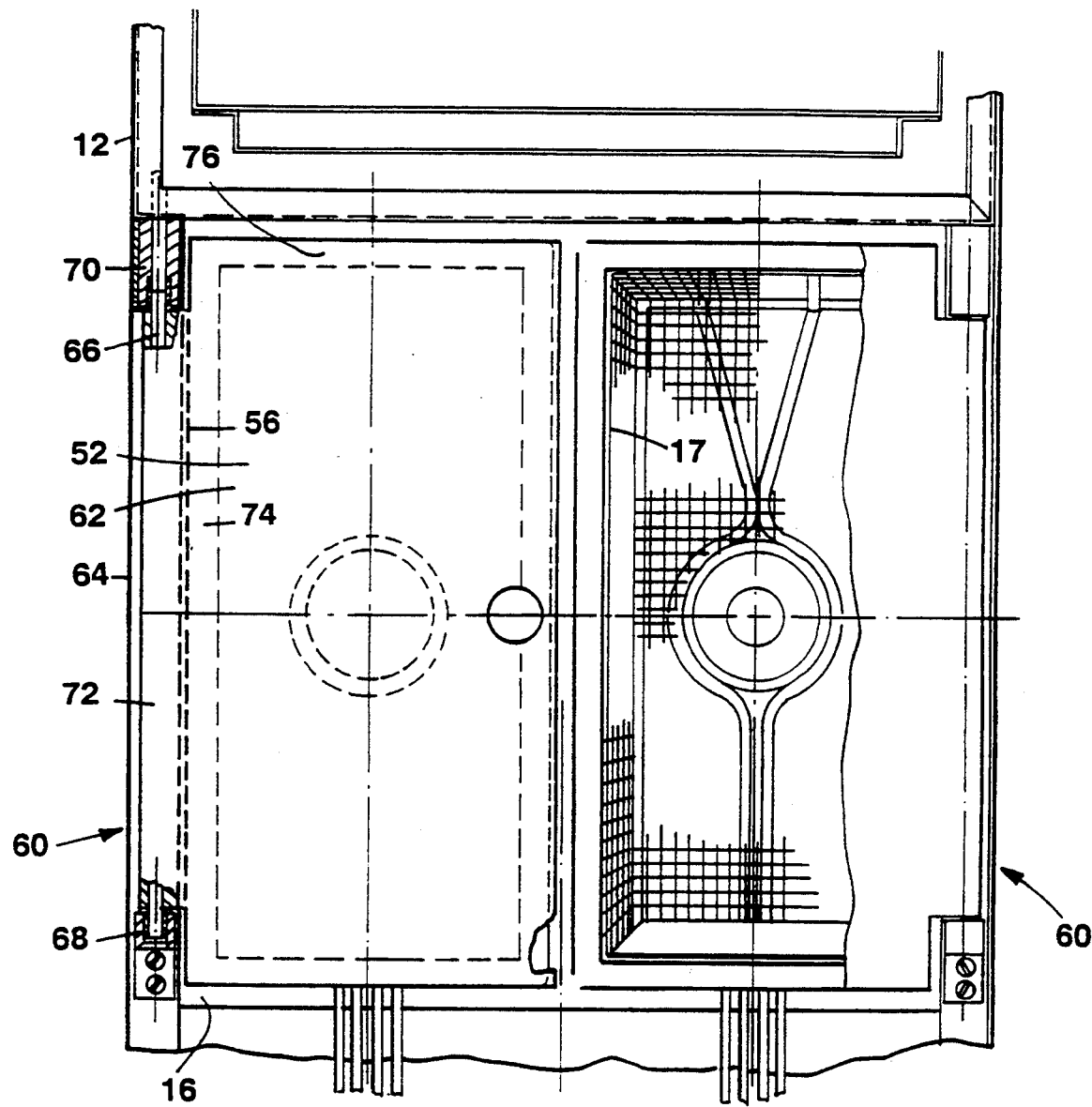
FIG. 7 is a plan view of the side-by-side fry basket reactors positioned within the fry tank of FIG. 1, each covered by its own hinged microwave trapping fry basket cover.

FIG. 7 shows the microwave tight door assembly 60 positioned over each of the side by side fry basket reactors 17 positioned in fry tank 16. The two door assemblies 60 are symmetrically identical, so only the left assembly in FIG. 7 will be described. Stainless steel door 62 is hinged to the top rail 64 of the fryer cabinet 12 by a hinge rod 66 extending longitudinally from hinge base 68 to and beyond hinge bearing 70. Door hinge portion 72 is fixed to hinge rod 66 between hinge base 68 and hinge bearing 70 so that rod 66 rotates when door 62 is opened or closed. Door 62 pivots about the longitudinal axis of rod 66 to cover basket 17 within fry tank 16, or remain open (not shown) while basket 17 is being placed in or removed from fry tank 16. Hinge rod 66 extends beyond hinge bearing 70 to operate an electric microwave safety interlock (FIG. 11) responsive to the position of door 62 as translated by the rotation of rod 66.

A microwave choke assembly 74 is attached to the underside 76 of door 62 to contact the entire peripheral edge 56 of the basket opening 52, thereby creating a microwave tight seal between the door 62 and the basket 52. This seal, combined with microwave tight basket mesh 46 and microwave antenna seal 126 (FIG. 13) discussed below, make the interior of basket 17 a microwave tight reactor vessel for the microwave cooking of food products.

Figure 8:
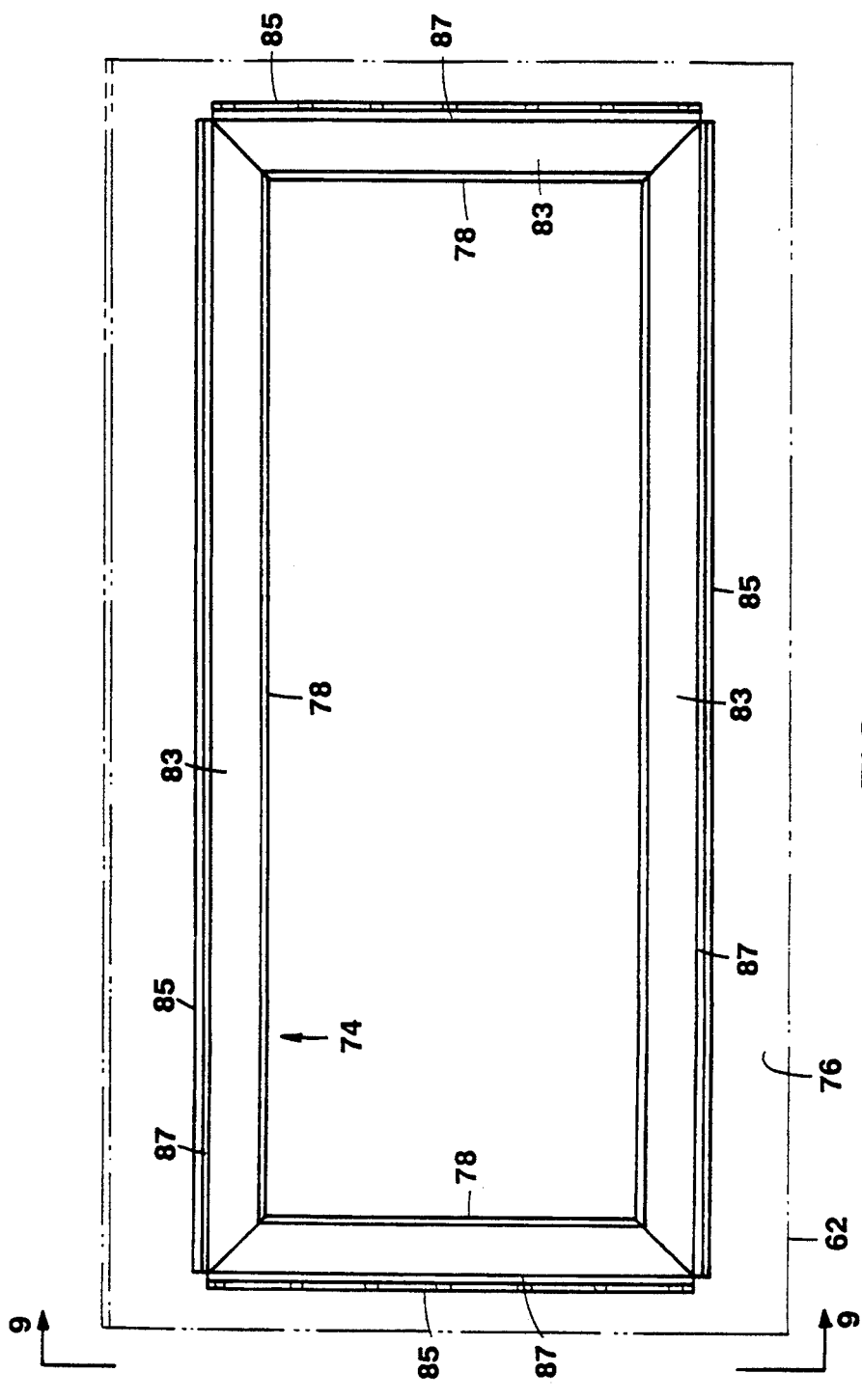
FIG. 8 is a plan view of the microwave choke attached to the underside of each fry basket cover of FIG. 7.
Figure 9:
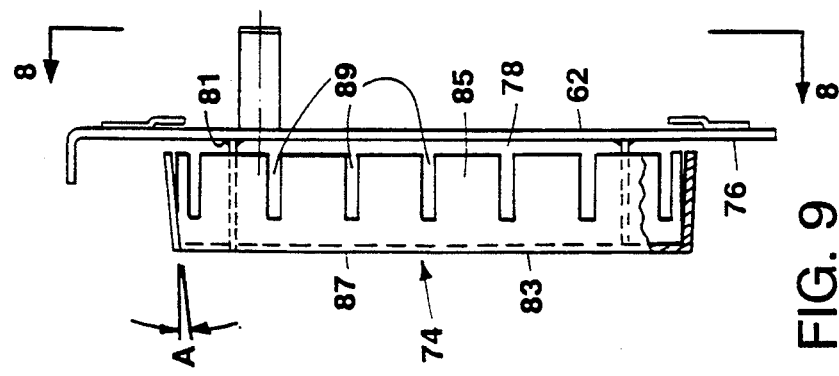
FIG. 9 is a side view of the microwave choke of FIG. 8.

FIGS. 8 and 9 show the construction of the microwave choke 74, attached to the underside 76 of door 62, used for sealing the top of the fry basket reactor 17 in fry tank 16 when cover 62 is closed over the basket.

Microwave choke 74 is fashioned as a rectangular frame protruding from the substantially planar surface 76 of stainless steel door 62. Interior peripheral wall 78 is disposed normal to surface 62 and is welded along its entire interface 81 with surface 76 to define the rectangular internal microwave tight wall of the choke. The choke face 83 extends from the edge of interior peripheral wall 78 opposite interface 81, toward the outer edges of cover 62, with the face 83 being substantially parallel to cover surface 76. Choke contact surface 85 forms the outer peripheral surface of choke 74. Contact surface 85 extends from outer peripheral edge 87 of face 83 toward surface 62 at a small angle A (FIG. 9) away from interior peripheral wall 78. This angle causes the contact surface 85 to resiliently urge against the peripheral edge 56 of basket opening 52 (FIG. 7) when door 62 is closed over basket 17 in fry tank 16. Additionally, contact surface 85 has a series of notches 89 cut to prevent circulation of microwave currents on the surface of the choke.

Figure 10:
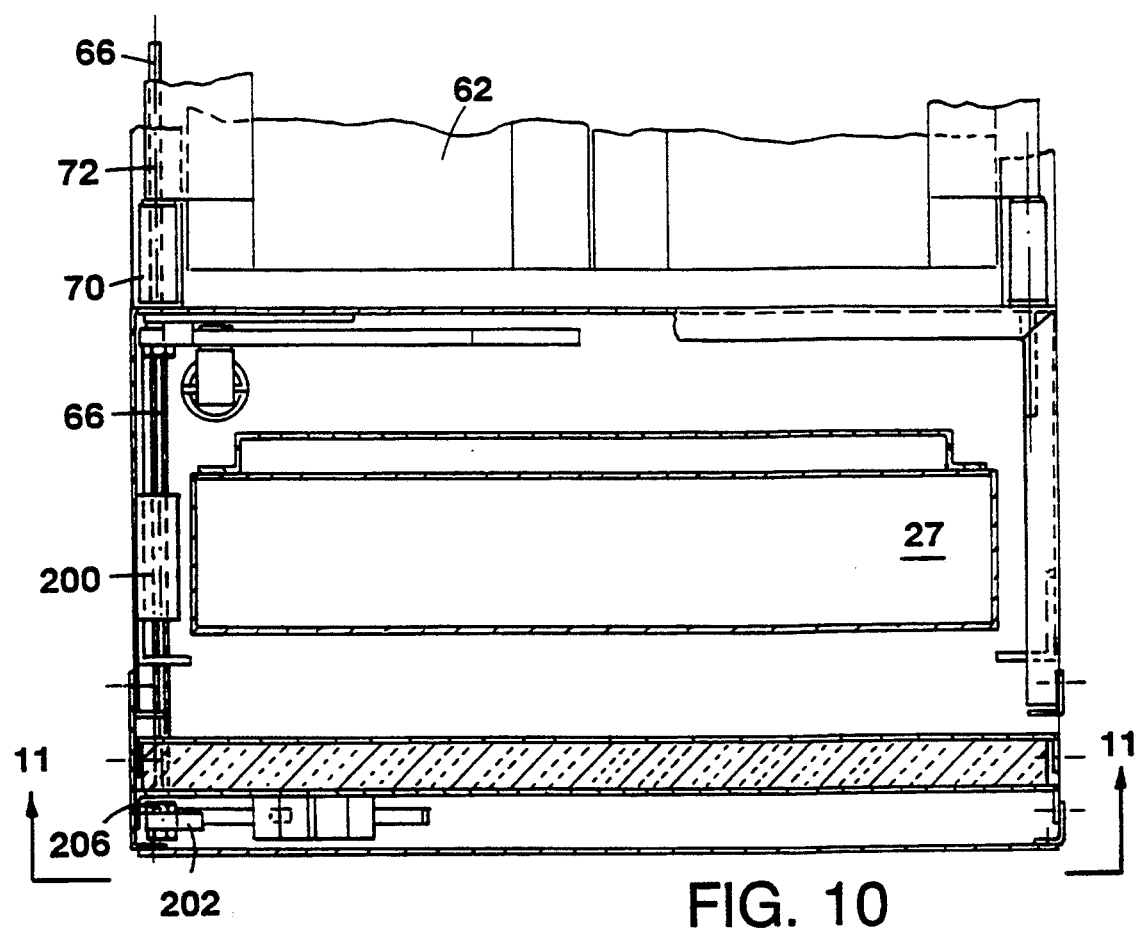
FIG. 10 is a rear view of the fryer of FIG. 1 showing the electric safety interlock mechanism.
Figure 11:
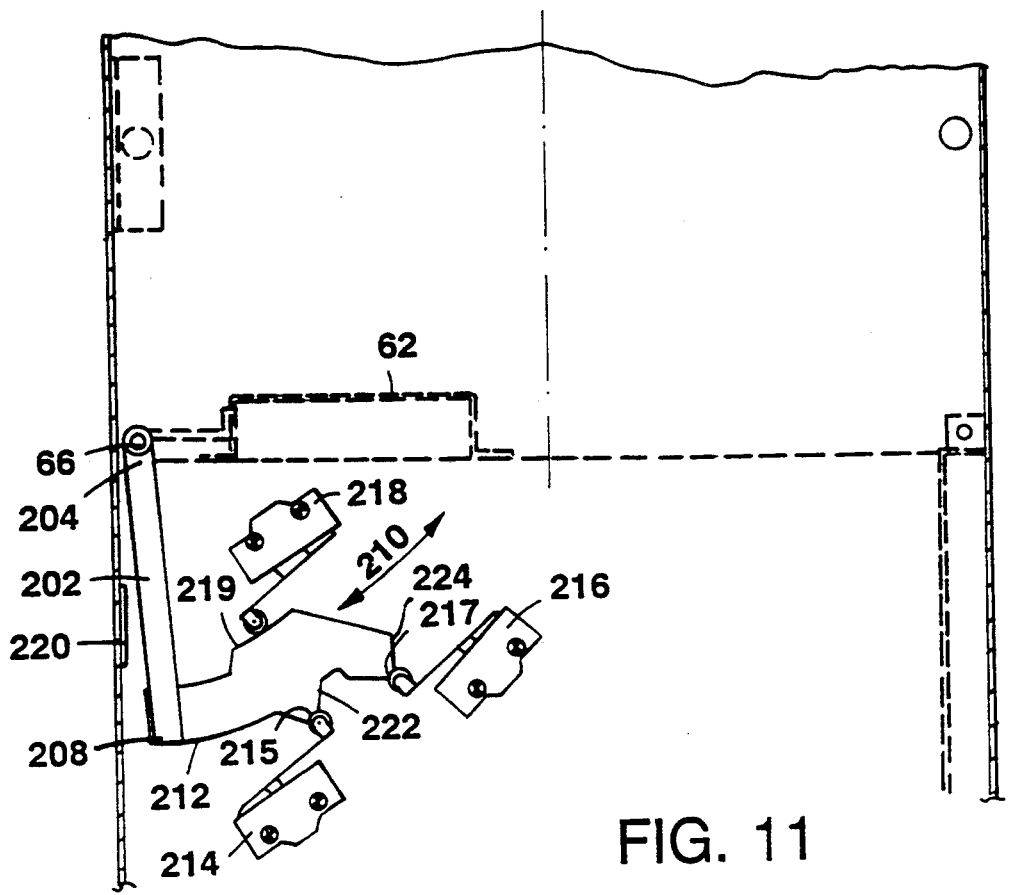
FIG. 11 is a detail view of the rear portion of the fryer of FIG. 1 showing the electric safety interlock switches and associated cam responsive to the position of the cover of FIG. 7.

FIGS. 10 and 11 show a cover controlled safety interlock mechanism which only energizes the microwave system when a basket 17 is properly in place in fry tank 16, the cover choke 74 is in place, and the cover 62 is closed over the basket. Only the right side mechanism (left side of FIG. 10 and 11) is shown and discussed since the left side mechanism is symmetrically identical. Hinge rod 66 extends through hinge bearing 70, through rod supports 200 and terminates in actuator arm 202 which is disposed at a right angle to rod 66. Rod 66 passes through the proximal end 204 of actuator arm 202, which is mechanically fixed to rod 66 by bolts 206, so that the distal end 208 of actuator arm 202 pivots about the longitudinal axis of rod 66 to sweep through arc 210 when door 62 is opened or closed. Safety interlock cam 212 is connected to the distal end 208 of actuator arm 202, and communicates with three safety interlock switches 214, 216, 218 by means of cam edges 215, 217, 219 respectively, as it is swept through arc 210.

FIG. 11 shows switches 214, 216 and 218 in the activated position. Switch 218 activates the microwave support circuitry, while switches 214 and 216 activate the supplying energy to its associated antenna. Switches 214 and 216 are wired is series, thus creating a redundancy preventing inadvertent activation in the case where one of the switches fails by shorting closed. As the cover sweeps from fully open (not shown) to fully closed (as illustrated), cam edge 219 activates switch 218, first, thereby activating the electronics prior to magnetron activation by switches 214 and 216. Switch 218 remains active throughout the remainder of the sweep allowed for door 62 as it goes toward, and possibly past its fully closed position as shown.

Magnetron activator switches 214 and 216 operate over only a very narrow range of the arc swept by cam 212, as is apparent by the relatively small activation area of cam surfaces 215 and 217. This narrow range corresponds to the door 62 being positioned as shown in FIG. 11, a position substantially parallel to the top of the fry basket reactor 17 in fry tank 16. This positioning can only occur when the cover choke 74 (FIG. 7) is fully engaged with the peripheral edge 56 of the fry basket 17. An angular variation as small as 5° from this position will shut down the magnetron. Further, if either the cover choke assembly 74 is missing or the fry basket reactor 17 is not in fry tank 16, the cover will go beyond its fully activated position, causing activator arm 202 to contact activator arm stop 220, and magnetron switches 214 and 216 to be deactivated by cam surface portions 222 and 224 respectively.

Figure 12:
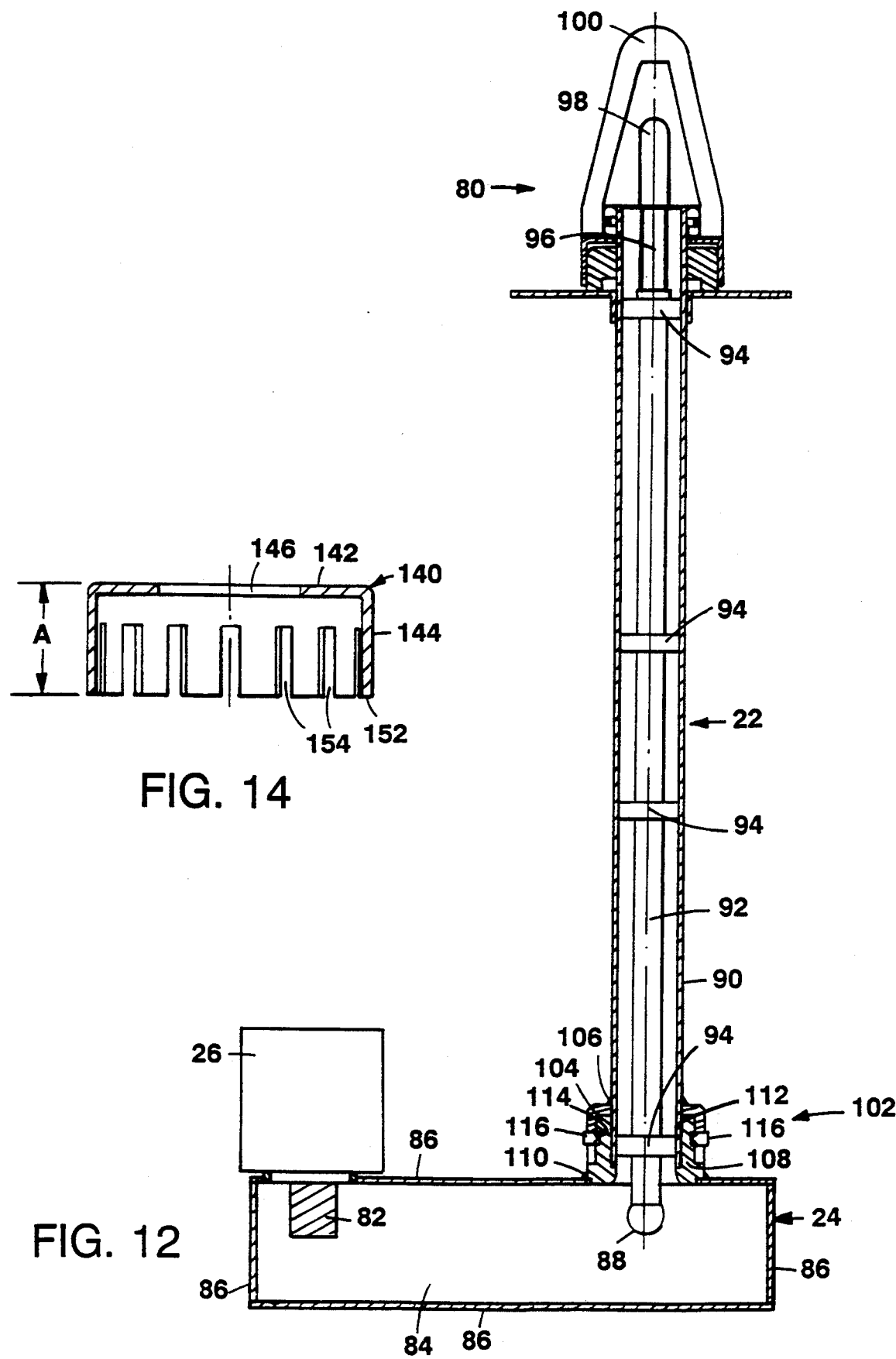
FIG. 12 is a detail longitudinal cross-section side view of the microwave producing magnetron taken along lines 12—12 of FIG. 2, showing the waveguide transition coupling, the longitudinal coaxial waveguide terminated in a microwave radiating antenna in an antenna hood, and a portion of the fry basket reactor interface choke.

FIG. 12 shows a longitudinal cross-section view of the microwave energy transmission system of this invention including microwave transition waveguide 24, coaxial waveguide 22 and microwave antenna assembly 80. Magnetron 26 develops microwave energy at magnetron output antenna 82 which is disposed part way into the rectangular microwave transition cavity 84 formed by the metal sides transition of box 86 which defines transition waveguide 24. Coaxial waveguide 22 input probe 88 is also disposed part way into transition cavity 84. The dimensions of the transition cavity 84, the placement of the magnetron output antenna 82, and the placement and diameter of coaxial waveguide input probe 88 are chosen to maximize the microwave energy transfer from magnetron antenna 82 to coaxial waveguide 24.

Coaxial waveguide 22 includes a cylindrical outer conductor constructed of 1" O.D.×0.065" wall 304 stainless steel tubing. Coaxial waveguide center conductor 92 is constructed of 0.38" diameter aluminum rod, and is held coaxially inside outer conductor 90 by Teflon retaining rings 94. A partially spherical probe 88 is threadably attached to the end of the center conductor 92 disposed in the transition cavity 84. A ½ wavelength long antenna matching transformer rod 96, having a diameter variable with respect to the diameter of inner conductor 92, is threadably attached between the antenna assembly 80 end of the center conductor 92 and antenna 98 to electronically match the coaxial waveguide 24 to the antenna 98. Antenna 98, disposed outside the end of outer conductor 90 inside Teflon antenna hood 100, is a 0.38" diameter aluminum rod threadably attached to the ½ wavelength transformer 96. The diameter of the ¼ wavelength transformer 96 depends on the length of antenna 98, and is chosen to maximize the microwave energy transferred from the coaxial waveguide 22 to the antenna 98.

The coaxial waveguide 22 is mechanically attached to the transition waveguide 24 by coupling assembly 102. Coupling assembly 102 includes an annular collar 104 circumferentially welded 106 to the outer conductor 90. Annular collar 104 mates with cylindrical coupler 108 which is circumferentially welded 110 to transition box 86. A coaxial counter-bore 112 in the coupler 108 accepts one end of the coaxial waveguide outer conductor 90. An annular groove 114 cut in the outer surface of coupler 108 accepts set screws 116 threadably disposed through collar 104 to allow tight mechanical and electrical coupling of the collar 104 to the coupler 108, thereby preventing microwave energy leakage through coupling assembly 102.

Figure 13:
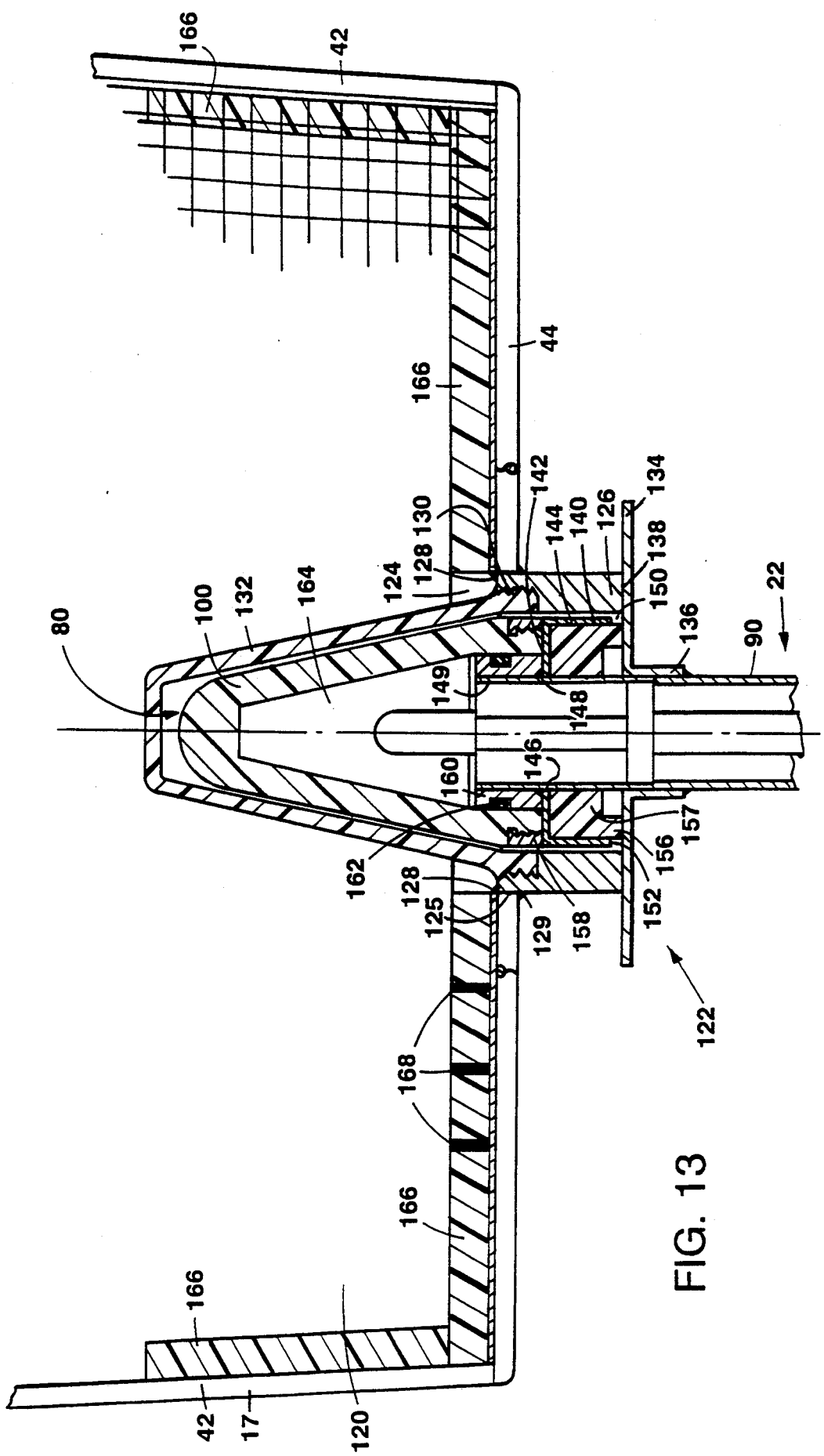
FIG. 13 is a cross-sectional side view of the microwave antenna to fry basket reactor interface taken along lines 13—13 of FIG. 1, showing the operational microwave choke and the relationship of the antenna hood to the fry basket saddle.

FIG. 13 shows a cross-sectional view of antenna assembly 80 coupled to fry basket reactor 17 to form a microwave tight reactor vessel 120. Microwave choke assembly 122, incorporated into the antenna assembly 80 interface, to basket 17 prevents microwave energy from escaping from the reactor vessel 120 through aperture 124 in basket 17 which is required to accept antenna assembly 80. Construction of a similar microwave choke was described Harhen in U.S. Pat. No. 3,789,178, incorporated herein by reference.

Basket seal 126 is a metallic cylindrical sleeve attached to the edge 125 of aperture 124, extending longitudinally outside the basket to surround the remainder of the choke assembly attached to coaxial waveguide 22. One end of basket seal 126 is circumferentially welded at 128 and 129 to aperture edge 125 in basket 17 to form a microwave-tight joint. The same end of basket seal 126 is internally threaded 130 to accept threaded Teflon basket saddle 132. Basket saddle 132 is shaped to accept antenna hood 100 without interference. Basket seal 126 is dimensioned to sit on choke base 134, attached to coaxial waveguide outer conductor 90, to support basket 17 when basket saddle 132 is placed on top of antenna assembly 80.

Choke base 134 is a metallic annular disk, radially disposed around coaxial waveguide outer conductor 90 and attached by means of a central annular flange 136. Annular flange 136 is circumferentially welded to outer conductor 90 to form a strong mechanical and microwave tight joint. Basket seal 126 annularly contacts choke base 134 at annular interface 138.

Antenna choke element 140 is a metallic cup having circular surface 142 with perpendicular cylindrical 144. Outer coaxial conductor 90 is disposed through a central aperture 146 in antenna choke element circular surface 142 so that cylindrical surface 144 is coaxial with outer conductor 90. Antenna choke central aperture 146 is circumferentially welded at 148 to outer conductor 90 between choke base 134 and the antenna end 149 of outer conductor 90 so that cylindrical surface 144 extends longitudinally from circular surface 142 toward choke base 134, leaving a small gap 150 between the annular edge 152 of cylindrical surface 144 and the surface of choke base 134. The annular space 156 around the outer conductor 90, substantially enclosed by the antenna choke element 140 and the choke base 134, is filled with a Teflon ring 157 to prevent debris from entering and accumulating in the space 156 through gap 150.

A cylindrical internally threaded flange 158 is connected to choke circular surface 142 directly opposite cylindrical surface 144 to threadably attach Teflon antenna hood 100 to the coaxial waveguide assembly 22. A metallic ring 160 having a silicone o-ring 162 disposed in an annular grove in its external surface is disposed between outer conductor 90 and antenna hood 100 to effectively seal the antenna compartment 164 from the hot cooking oil in which it is immersed.

FIG. 14 shows a longitudinal cross-sectional view of antenna choke element 140. Multiple longitudinal slots are distributed around the circumference of cylindrical surface 144 to effectively eliminate any microwave currents that may circulate on surface 144. The dimension A of cylindrical surface 144 is ¼ wavelength of the microwave energy. The combination of the ¼ wavelength surface 144, its position adjacent to basket seal 126 (FIG. 13) and annular gap 150 prevent microwave energy from leaking out of the basket seal/choke base interface 138. The choke functions by diverting energy that reaches gap 150 back along ¼ wavelength surface 144 to system ground at choke element circular surface 142.

Referring again to FIG. 13, four Teflon plates 166 are disposed adjacent to the bottom 44 and short sides 42 of the fry basket reactor 17. A series of holes 168 are disposed through each Teflon plate 166 to allow oil to circulate through the plates. The Teflon plates allow some microwave energy to travel through the plates and bypass food products in close proximity to antenna assembly 80, and thereby provide a more uniform microwave energy distribution among all food products in the basket 17. The result is a uniformly heated food product independent of its location within the basket 17.

OPERATION

Cooking tests of the microwave enhanced deep fat fryer of this invention were performed on 2 lbs. of frozen (−12° C.) breaded chicken nuggets weighing about 0.7 ounces (19 grams) each. The fry basket reactor was removed from the fryer and the nuggets were arranged uniformly in the bottom of the fry basket reactor. The level of cooking oil in the fry tank was sufficient to cover all the food product as arranged in the fry basket reactor when the reactor was properly positioned in the fry tank. The gas fired fire tubes were ignited and allowed to raise and maintain the temperature of the cooking oil in the fry tank to 177° C. Then, the fry basket reactor was lowered into the fry tank. Promptly, the fry basket reactor cover was closed which activated the microwave energy applied to the reactor. 700 Watts of microwave energy was introduced into the fry basket reactor for 2 minutes and 45 seconds, after which the cover was opened and the reactor promptly removed from the fry tank.

The temperature of the chicken nuggets, fried as described above, was raised from a frozen starting internal temperature of −12° C. to an ending internal temperature of 76 −91° C. in a little over 2 minutes and 45 seconds. The product quality was excellent, exhibiting uniform cooking; crisp and brown outside, juicy and tender inside. A comparable time required to obtain this temperature rise by frying alone is about 4 minutes. Thus, microwave enhanced deep fat frying reduced cooking time in this case by 31%.

Similar tests performed on other food products showed cooking time savings of between 15% and 50% oven frying alone, with excellent quality results.

ADVANTAGES

The microwave enhanced deep fat fryer technology described above has compelling advantages in the preparation of deep fat fried fast foods in commercial establishments, particularly in accelerating the cooking of frozen food products to fully cooked with upwards of 50% decrease in cooking time over conventional deep fat fryers. This is highly desirable since it allows deep fat fried food products to be cooked to order rather than being prepared in advance and reheated to fill an order. Such cooking to order substantially contributes to high product quality and consistency.

A highly desirable feature of the invention is the ability to prepare deep fat fried foods in less time while retaining the flavor, crispness and color of a deep fat fried food product. The invention combines the speed of microwave cooking with the product qualities of deep fat fried foods in a manner that produces consistently excellent results.

Another highly desirable feature of the invention is the ability to apply the microwaves directly to the food product in a small microwave-tight enclosure, thereby enhancing the control of microwave cooking energy applied to the food product. This results in consistent, predictable and well controlled cooking of the food product, while minimizing the amount of microwave energy used. Energy savings are enhanced since only a minimal amount of microwave energy is diverted to heating the cooking oil in the fry tank reservoir.

The use of advanced microwave energy chokes and electrical safety interlocks provide the advantages of mechanical simplicity while making the invention safe and easy to use. Small size of the microwave enhanced fryer makes it ideal for fast food establishments where floor space is often at a premium. One preferred embodiment described herein is a modification of a standard commercial deep fat fryer that retains all of the original features including the standard roll-away oil filter and the original footprint of the unmodified commercial unit.

The foregoing description has been directed to specific embodiments for the purposes of illustration. Many variations and modifications designed for the same applications or other applications are possible without departing from the principles of the invention. Other embodiments are within the spirit and scope of the invention as claimed below.

What is claimed is:

1. A cooking vessel for use with a microwave enhanced deep fat fryer wherein microwaves are introduced into said cooking vessel by microwave introducing means within said cooking vessel, said cooking vessel comprising:
    an open topped basket having elongated side, end, and bottom oil porous surfaces, said surfaces being substantially impenetrable to microwave energy;
    a handle extending from one said end surface; and
    an indentation centrally located in said bottom surface for accepting the microwave introducing means.

2. The cooking vessel of claim 1, wherein said indentation includes
    an aperture in said bottom of said basket; and
    an aperture cover attached to and extending into said basket to enclose said aperture, said aperture cover being made of a high temperature tolerant, low microwave loss material;

wherein said aperture and said aperture cover are sized and shaped to accept the microwave introducing means.

3. The cooking vessel of claim 2 wherein said aperture cover is conically shaped.

4. The cooking vessel of claim 2 wherein said aperture cover is made from polytetrafluroethylene.

5. The cooking vessel of claim 2 wherein said aperture cover is threadably engaged with said cooking vessel.

6. The cooking vessel of claim 2 wherein said elongated side, end and bottom surfaces comprises metallic mesh sized to substantially prevent the escape of microwave energy.

7. A microwave fry basket comprising:
   a bottom surface and side surfaces made of porous metallic material designed to substantially confine microwave energy within said basket;
   an aperture in one of said surfaces; and
   an indentation made of microwave transparent material, said indentation positioned over said aperture and extending into said basket.

8. The basket of claim 7 wherein said indentation is conical with a base generally at the bottom surface of the basket.

9. The basket of claim 7 further comprising a metal sleeve coupled to the porous metallic bottom surface at the aperture, said sleeve forming a microwave seal.

10. A cooking vessel for use with a microwave enhanced deep fat fryer comprising:
    a bottom surface and side surfaces defining an opening for introducing food articles into said vessel, at least one of said surfaces being porous and having passages which allow entry of cooking oil into said vessel, said passages sized to substantially confine microwave energy within said vessel;
    an aperture in one of said surfaces for introducing a microwave energy source into said vessel; and
    an aperture cover positioned over said aperture and extending into said vessel so as to allow introduction of the microwave energy source into said vessel, said aperture cover being made from temperature resistant, low microwave loss material.

11. The cooking vessel of claim 10 wherein said porous surface is made from mesh.

12. The cooking vessel of claim 11 wherein said mesh is stainless steel.

13. The cooking vessel of claim 10 wherein said aperture cover is made from polytetrafluroethylene.

14. The cooking vessel of claim 10, further comprising a sleeve surrounding said aperture, said sleeve forming a microwave seal.

15. The cooking vessel of claim 10, further comprising a peripheral lip surrounding said opening, said peripheral lip forming a microwave seal.

16. The cooking vessel of claim 10, further comprising a handle extending from one of said side surfaces.

17. A metallic mesh fry basket for a microwave-enhanced deep fat fryer having a bottom and an aperture in the bottom of the basket covered by a temperature resistant, low microwave-loss material through which microwave energy may be introduced into the basket, the mesh being sized to contain said microwave energy within said basket.

* * * * *

UNITED STATES PATENT AND TRADEMARK OFFICE
CERTIFICATE OF CORRECTION

PATENT NO.  : 5,363,749

DATED       : November 15, 1994

INVENTOR(S) : James R. Hurley et al.

It is certified that error appears in the above-identified patent and that said Letters Patent is hereby corrected as shown below:

```
Column 5, line 7, "wired is series" should be --wired in
series--.
Column 5, line 41, "sides transition of" should be --sides
of transition--.
Column 5, lines 48-49, "coaxial waveguide 24" should be --
coaxial waveguide 22--.
Column 5, lines 62-63, "coaxial waveguide 24" should be --
coaxial waveguide 22--.
Column 6, line 22, "from the reactor" should be --from
inside the reactor--.
Column 6, line 23, "basket 17" should be --basket 17,--.
Column 6, line 25, "described" should be --described by--.
Column 6, line 49, "cylindrical 144" should be --cylindrical
surface 144--.
Column 8, line 17, "The-invention" should be --The
invention--.
```

Signed and Sealed this

Twenty-third Day of July, 1996

Attest:

BRUCE LEHMAN

*Attesting Officer*       *Commissioner of Patents and Trademarks*